(12) United States Patent
Campbell

(10) Patent No.: US 7,152,708 B2
(45) Date of Patent: Dec. 26, 2006

(54) PROPSHAFT WITH IMPROVED CRASH-WORTHINESS

(75) Inventor: Craig A. Campbell, West Bloomfield, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 10/644,475

(22) Filed: Aug. 20, 2003

(65) Prior Publication Data

US 2005/0062342 A1    Mar. 24, 2005

(51) Int. Cl.
    *B60K 17/22* (2006.01)
(52) U.S. Cl. ............... 180/376; 464/183; 301/124.1; 301/126; 72/110
(58) Field of Classification Search ............... 180/376, 180/379, 274, 232; 301/126, 124.1; 464/183, 464/162, 180; 72/110, 80, 107, 61, 58; 293/132
See application file for complete search history.

(56) References Cited

U.S. PATENT DOCUMENTS

| | | | |
|---|---|---|---|
| 2,988,805 A * | 6/1961 | Thompson | ............... 29/888.43 |
| 3,903,982 A | 9/1975 | Sorsche et al. | |
| 5,230,658 A * | 7/1993 | Burton | ............... 464/16 |
| 5,566,777 A | 10/1996 | Trommer et al. | |
| 5,983,497 A * | 11/1999 | Breese et al. | ............... 29/897.2 |
| 6,371,859 B1 * | 4/2002 | Gibson | ............... 464/183 |
| 6,543,266 B1 * | 4/2003 | Jaekel | ............... 72/61 |

FOREIGN PATENT DOCUMENTS

| | | |
|---|---|---|
| DE | 94 16 640 U | 12/1994 |
| EP | 0 763 448 A | 3/1997 |
| EP | 0763448 A1 * | 3/1997 |
| GB | 2 172 376 A | 9/1986 |
| GB | 2172376 A * | 9/1986 |

OTHER PUBLICATIONS

PCT Notification of Transmittal of the International Search Report and the Written Opinion of the International Searching Authority, Jan. 3, 2005, 3 pages.
PCT International Search Report by the International Searching Authority of the European Patent Office, Jan. 3, 2005, 4 pages.
PCT Writen Opinion of the International Searching Authority of the European Patent Office, Jan. 3, 2005, 5 pages.

* cited by examiner

*Primary Examiner*—S. Joseph Morano
(74) *Attorney, Agent, or Firm*—Jennifer M. Brumbaugh; Mick A. Nylander

(57) ABSTRACT

A frangible telescopic propeller shaft includes an elongated hollow cylindrical body, a reduced diameter intermediate portion along a length of the body, and at least one spin-formed transition area between the intermediate portion and the body. The transition area includes a frangible feature wherein at least a part of the cylindrical body lies over the intermediate portion such that, in response to a sufficient axial force, the frangible feature fractures to telescope the body over the intermediate portion.

17 Claims, 3 Drawing Sheets

# PROPSHAFT WITH IMPROVED CRASH-WORTHINESS

TECHNICAL FIELD

The present invention relates generally to motor vehicle propeller shafts, and more particularly concerns a propeller shaft having improved crash-worthiness.

BACKGROUND OF THE INVENTION

Constant velocity (CV) joints are common components in automotive vehicles. Typically, CV joints are employed where transmission of a constant velocity rotary motion is desired or required. Common types of constant velocity joints are a plunging tripod, a fixed tripod, a plunging ball joint and a fixed ball joint. These types of joints are currently used in front wheel drive vehicles, or rear wheel drive vehicles, and on the propeller shafts found in rear wheel drive, all wheel drive, and four wheel drive vehicles.

Propeller shafts are also commonly used in motor vehicles to transfer torque from the front drive unit to a rear axle such as in a rear wheel and all wheel drive vehicles. Propeller shafts are also used to transfer torque and rotational movement to the front axle in four wheel drive vehicles. In particular, two-piece propeller shafts are commonly used when larger distances exist between the front drive unit and the rear axle of the vehicle.

Besides transferring mechanical energy, it is desirable for propeller shafts to have adequate crash-worthiness. In particular, it is desirable for the propeller shaft to be shortened axially to prevent it from buckling, penetrating the passenger compartment, or damaging other vehicle components in close proximity of the propeller shaft. In many crash situations, the vehicle body shortens and deforms. As a result, it is desirable that the vehicle propshaft be able to reduce in length during the crash, at or below a specified load. It is further desirable for the propeller shaft to absorb a considerable amount of the deformation energy during the crash. Thus, it is desireable that a mechanism be provided for permitting the propeller shaft to collapse under appropriate loads without compromising the driveline performance under normal operating conditions.

SUMMARY OF THE INVENTION

In one embodiment, a propeller shaft for a vehicle is provided which includes an elongated hollow cylindrical body having a reduced profile intermediate portion defining at least one transition area between the intermediate portion and the body. In the region of the transition area, at least part of the cylindrical body lies over the intermediate portion such that during fracture in the region of the transition area, the body telescopes over the intermediate portion. The intermediate portion extends along approximately 10–30 percent of the length of the body, and can be angled or parallel with respect to the cylindrical body. Approximately 1–10 mm of the cylindrical body can be made to overlap the intermediate portion in the transition area.

In another embodiment, a frangible telescopic propeller shaft is provided. The shaft includes an elongated hollow cylindrical body, a reduced diameter intermediate portion along a length of the body, and at least one spin-formed transition area between the intermediate portion and the body. The transition area includes a frangible feature wherein at least a part of the cylindrical body lies over the intermediate portion such that, in response to a sufficient axial force, the frangible feature fractures to telescope the body over the intermediate portion.

In another embodiment of the invention, a method of making a propeller shaft is provided. The method includes providing an elongated hollow cylindrical body, and spin-forming a reduced profile intermediate portion along a length of the body, the intermediate portion defining at least one transition area between the intermediate portion and the body. Thereafter, in the region of the at least one transition area, an axial force is applied to the body while the exterior surface of the cylindrical body is simultaneously supported to fold the at least one transition area onto itself such that at least a part of the cylindrical body lies over the intermediate portion in the region of the transition area.

One of several advantages of the present invention is that the spin-formed feature permits the propeller shaft to collapse within itself in a telescopic fashion at a predetermined axially load. The present invention itself, together with further objects and intended advantages, will be best understood by reference to the following detailed description, taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

In the following description, various operating parameters and components are described for one constructed embodiment. These specific parameters and components are included as examples and are not meant to be limiting.

While the invention is described with respect to a propeller shaft having improved crash-worthiness within a vehicle driveline, the following apparatus is capable of being adapted for various purposes including automotive vehicles, motor systems that use a propeller shaft, or other vehicles and non-vehicle applications which require collapsible propeller shaft assemblies.

Figure 1:
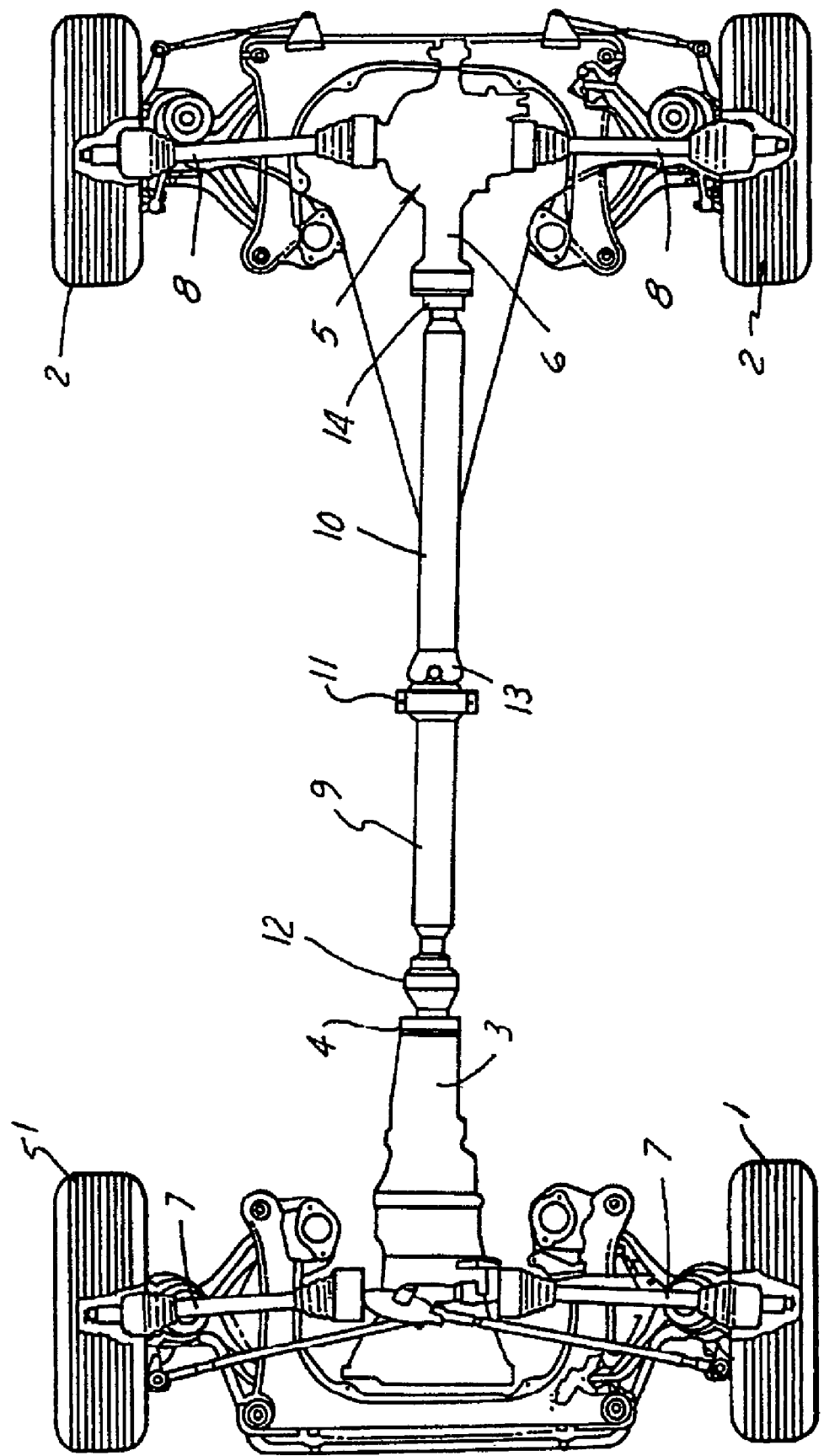
FIG. 1 shows a plan view of a vehicle driveline having a propeller shaft assembly in which the present invention may be used to advantage.

Referring now to the drawings wherein like reference numerals are used to identify identical components of the various views, FIG. 1 illustrates a diagrammatic view of an exemplary driveline of a motor vehicle having a propeller shaft assembly in which the present invention may be used to advantage. The driveline assembly of FIG. 1 is illustrative of the environment in which a propeller shaft in accordance with the present invention may be used. Other driveline layouts may also be improved by use of the propeller shaft disclosed herein, including single unit propeller shaft arrangements or multi-section propeller shaft arrangements for rear wheel drive or four-wheel drive vehicles. The shaft in accordance with the present invention may also be used in side shaft assemblies, or in non-automotive torque shaft applications.

In the example of FIG. 1, there is shown a driveline for a four-wheel drive vehicle. The two front wheels 1 and the two rear wheels 2 are driven. FIG. 1 also shows the gear box 3 with the gear box output 4. In the region of the rear axle, there is provided an axle drive 5 with a drive input 6. The two front wheels 1 are driven by side shafts 7. The two rear wheels 2 are driven by the side shafts 8, starting from the axle drive 5. The connection between the gear box 3 and the axle drive 5 is provided by a propeller shaft assembly which comprises two propeller shaft portions 9 and 10. The propeller shaft assembly is additionally supported on the floor assembly of the vehicle by an intermediate bearing 11 which, in this example, is arranged approximately centrally. The intermediate or center bearing 11 can be a center bearing tuned absorber, i.e., a dynamic damper.

In the first propeller shaft portion 9, the propeller shaft assembly includes a first rotary joint 12 arranged near the gear box output 4. For connecting the two propeller shaft portions 9, 10, there is provided a second rotary joint 13. At the end of the second propeller shaft portion 10, there is arranged a third rotary joint 14 which, via a connecting mechanism, is connected to the drive input 6 of the axle drive 5 in the region of the rear axle. The rotary joints 12, 13, 14 may be cardan joints or any one of several types of constant velocity joints such as a plunging tripod, a crossgroove joint or fixed joint, a fixed tripod joint or a double-offset joint. In this example, all three joints 12, 13, 14 are constant velocity fixed joints. In most applications, the propeller shaft portions 9, 10 rotate at a speed which is higher than the speed introduced by the engine into the manual or automatic gear box. The reduction of the speed of the rear wheels 2 takes place in the axle drive 5. Whereas, for example, the propeller shaft assembly with the propeller shaft portions 9, 10 and the associated the joints 12, 13, 14 may be required to rotate at speeds of up to 10,000 revolutions per minute, the speeds of the side shafts 8 for driving the rear wheels 2 may only reach approximately up to 2,500 revolutions per minute.

Thus, the driveline assembly of FIG. 1 is a multi-sectional propeller shaft driveline assembly including two propeller shaft portions 9, 10, at least one of which is a propeller shaft having improved crash-worthiness in accordance with the present invention. The present invention may also be used to advantage front-wheel drive, all-wheel drive, rear-wheel drive or other four-wheel drive driveline configurations. The improved propeller shaft of the present invention can also be used to advantage driveline assemblies having a singular propeller shaft (omitting the second joint 13), or propeller shaft assemblies having more than two propeller shaft portions.

Figure 2:
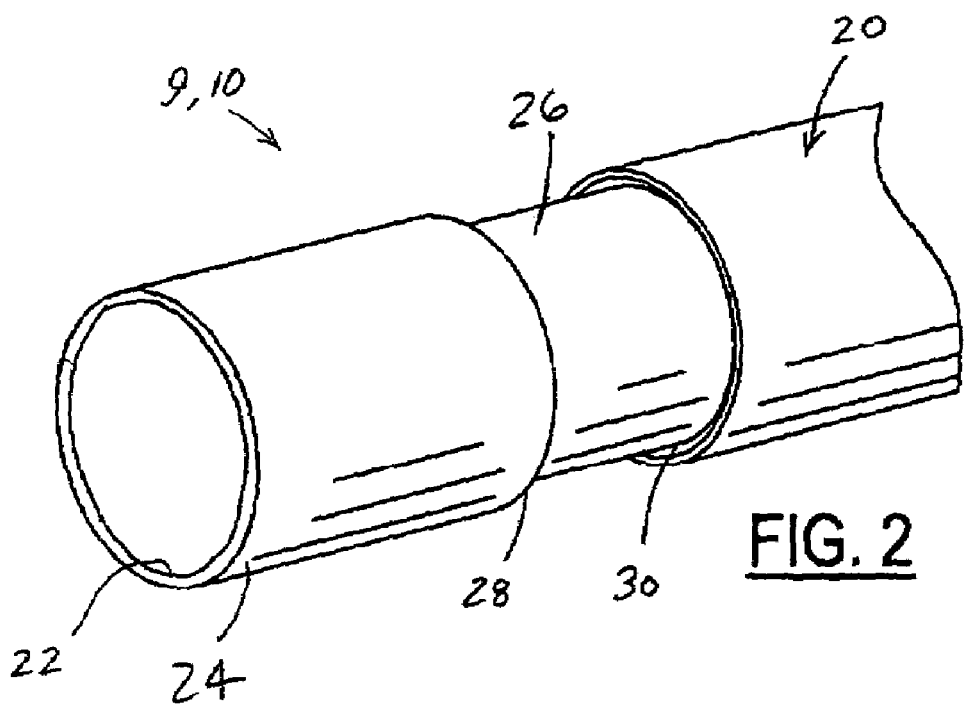
FIG. 2 shows a partial perspective view of a propeller shaft according to one embodiment of the present invention.

Referring now to FIG. 2, there is shown a partial perspective view of a propeller shaft according to one embodiment of the present invention. The propeller shaft 9, 10 includes a thin-walled hollow tubular body 20. The tubular body 20 is made of metal which is capable of being spin-formed as described in more detail below. The tubular body 20 has an interior surface 22 and an exterior surface 24. Along a section of the body 20 there is formed an intermediate region 26 having a reduced diameter or profile as compared to the cylindrical body 20. The intermediate region 26 is formed by a spinning operation as described in more detail below with reference to FIGS. 3 and 4. Transition regions 28, 30 are formed during the spinning operation. At least one of the transition regions 28, 30 is formed such that a portion of the body 20 lies over the intermediate region 26. The formation of the intermediate region 26 and transition regions 28, 30 will be described below with respect to FIGS. 3 and 4.

Figure 3:
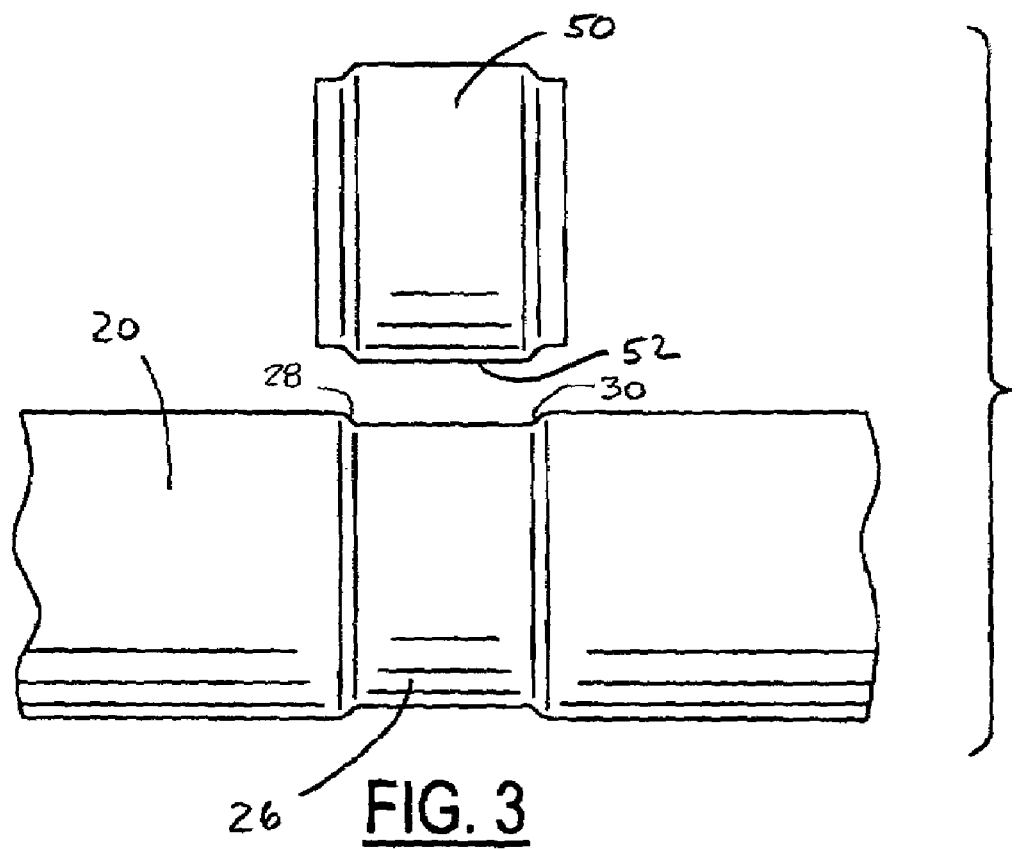
FIG. 3 shows the propeller shaft of FIG. 2 after a first rolling operation.

Referring now to FIG. 3, there is shown a propeller shaft in accordance with the present invention after a first spin-forming operation. In a first production stage, the hollow cylindrical tube 20 is spin-formed by a profiled first roller 50 or set of profiled rollers to form the reduced diameter intermediate region 26. The roller 50 includes a graduated region 52 to form the corresponding stepped or reduced diameter intermediate region 26 along a portion of the tubular metal body 20 of the propeller shaft. After the first spin-forming operation, the transition regions 28, 30 comprise an inclined or tapered surface separating the intermediate region 26 from the remainder of the cylindrical body 20.

Figure 4:
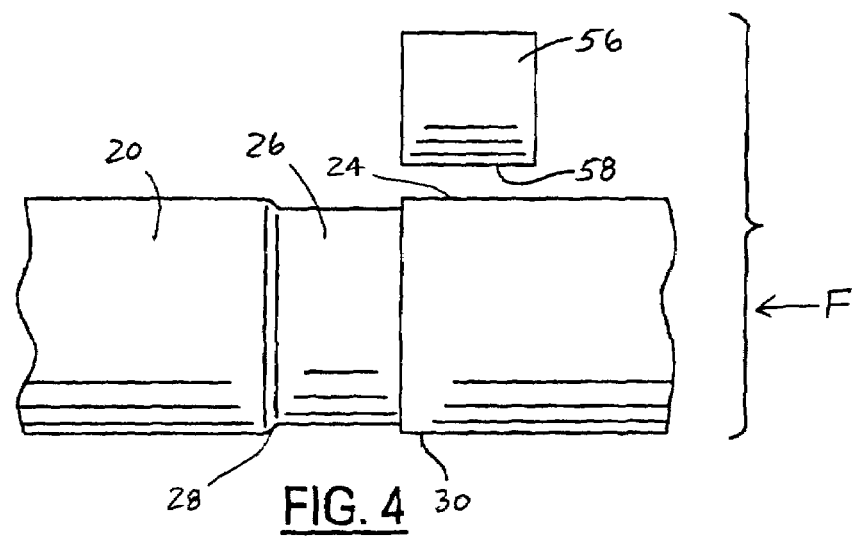
FIG. 4 shows the propeller shaft of FIG. 2 after a second rolling operation.

Referring now to FIG. 4, there is shown the propeller shaft of FIG. 3 during a second spin-forming and axial loading operation. In the second spin-forming operation, a roller or set of rollers represented by roller 56 is brought into contact with the exterior surface 24 of the cylindrical body 20 in the area of one of the transition regions 30. The roller surface 58 is flat and corresponds to the outer diameter of the cylindrical body 20. The roller 56 maintains the exterior dimension of the cylindrical body 20 while the shaft is loaded axially. While the roller 56 is in contact with the exterior surface 24 of the cylindrical body 20, an axial force F is applied in the direction of the arrow shown in FIG. 4 to fold the transition area 30 back onto itself such that a portion of the body 20 lies over at least a portion of the intermediate region 26. The first and second spin forming operations can be hot or cold forming operations depending upon the material used for the propeller shaft and the desired material properties for the remitting shaft.

Figure 5:
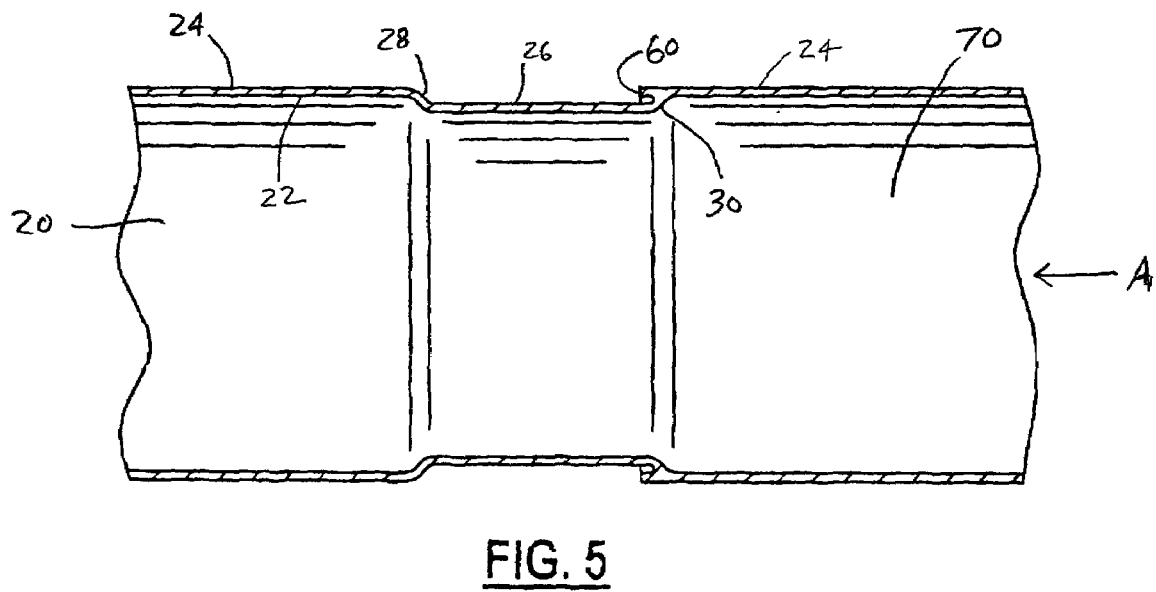
FIG. 5 shows a sectional view of the propeller shaft of FIG. 2.

As a result of the second spin-forming and axial loading operation, the propeller shaft has an improved crash-worthiness feature which can best be seen with reference to FIG. 5. FIG. 5 shows a longitudinal sectional view of the propeller shaft of FIG. 4 after the second spin-forming operation. As can be seen in FIG. 5, in the transition region 30, the exterior surface 24 of the cylindrical body 20 has been forced towards the intermediate region 26 such that an end 60 of the tubular body 20 lies over the intermediate region 26. The amount of overlap can be between approximately 1–10 mm, although more or less overlap may be desireable for certain applications.

In operation, in the event of a sufficient axial load in the direction of arrow A, the transition region 30 will fracture and the body segment 70 will move towards the intermediate region 26 and telescope over the intermediate region 26 to collapse the propeller shaft in the axial direction. The formation of the crash feature in the transition region 30 can be designed such that the crash feature is activated only when a predetermined axial load has been exceeded. For example, the crash feature may be cold formed or hot formed depending upon the desired elasticity and fracture-ability of the resulting transition region in the propeller shaft. Similarly, the profile of the intermediate region 26 can be altered to provide a desired fracture behavior for the overall shaft. For example, the intermediate region 26 can have a diameter which is on the order of 80 to 95% of the diameter of the tubular body 20. The greater diameter reduction between the intermediate region 26 and the body 20, the weaker the transition areas 28, 30 will be in most cases. The length of the intermediate region 26 can also vary depending upon the range of telescoping desired for the propeller shaft under consideration in the event of a sufficient axial load. In most cases, it is contemplated that the intermediate region 26 will comprise between 5 and 30% of the overall length of the propeller shaft.

From the foregoing, it can be seen that there has been brought to the art a new and improved propeller shaft which has advantages over prior propeller shaft assemblies. While the invention has been described in connection with one or more embodiments, it should be understood that the invention is not limited to those embodiments. For example, a propeller shaft in accordance with the present invention may include more than one intermediate region with a formed crash feature. In addition, both of the transition regions 28, 30 can include the formed crash feature. Similarly, the profiles of the first and second rollers 50, 56 can vary without departing from the scope of the present invention. For example, the first roller 50 could be profiled such that the tubular body 20 gradually transitions from the exterior surface 24 to the transition region 30 resulting in an inclined intermediate region 26 rather than a stepped intermediate region 26 as shown. Thus, the invention covers all alternatives, modifications, and equivalents as may be included within the spirit and scope of the appended claims.

What is claimed is:

1. A propeller shaft for a vehicle comprising an elongated hollow cylindrical body and a reduced profile intermediate portion formed into a wall of the elongated hollow cylindrical body, the intermediate portion having a reduced diameter as compared to the body and defining two transition areas, one at each end of the intermediate portion, wherein in the region of at least one transition area prior to receiving a sufficient axial load from a crash event, at least part of the cylindrical body lies over the intermediate portion such that upon receiving the sufficient axial load and during fracture in the region of at least one of the transition areas, the body telescopes over the intermediate portion, and wherein neither transition area extends radially inwardly into the hollow cylindrical body.

2. A propeller shaft according to claim 1 wherein the shaft is metal.

3. A propeller shaft according to claim 1 wherein the intermediate portion comprises between 5 and 30 percent of the length of the propeller shaft.

4. A propeller shaft according to claim 1 wherein the intermediate portion extends substantially parallel to the cylindrical body.

5. A propeller shaft according to claim 1 wherein the intermediate portion is angled with respect to the cylindrical body.

6. A frangible telescopic propeller shaft comprising:
an elongated hollow cylindrical body;
a reduced diameter intermediate portion along a length of the body and distanced from an end of the body, the intermediate portion defining two transition areas with respect to the body; and
at least one of the transition areas being a spin-formed transition area comprising a frangible feature wherein at least a part of the cylindrical body lies over the intermediate portion prior to receiving a sufficient axial load from a crash event such that, in response to the sufficient axial force, the frangible feature fractures to telescope the body over the intermediate portion, and wherein neither transition area extends radially inwardly into the hollow cylindrical body.

7. A propeller shaft according to claim 6 wherein the shaft is metal.

8. A propeller shaft according to claim 6 wherein the intermediate portion comprises between 5 and 30 percent of the length of the propeller shaft.

9. A propeller shaft according to claim 6 wherein the intermediate portion extends substantially parallel to the cylindrical body.

10. A propeller shaft according to claim 6 wherein the intermediate portion is angled with respect to the cylindrical body.

11. A propeller shaft according to claim 6 wherein the cylindrical body lies over the intermediate portion by between 1 and 10 mm.

12. A method of making a propeller shaft comprising:
providing an elongated hollow cylindrical body;
spin forming a reduced profile intermediate portion along a length of the body, and distanced from an end of the body, the intermediate portion defining at least two transition areas with respect to the body; and
thereafter, in the region of at least one of said transition areas, applying an axial force to the body to fold the at least one transition area onto itself such that at least a part of the cylindrical body lies over the intermediate portion in the region of the at least one transition area prior to receiving a sufficient axial load from a crash event, and wherein neither transition area extends radially inwardly into the hollow cylindrical body.

13. A method according to claim 12 comprising, while applying the axial force, simultaneously supporting the exterior surface of the cylindrical body to maintain the body diameter.

14. A method according to claim 13 wherein supporting includes supporting the exterior surface of the cylindrical body with at least one roller.

15. A method according to claim 13 wherein said intermediate portion defines two transition areas, one at each end thereof.

16. A method according to claim 13 wherein spin-forming includes cold forming.

17. A method according to claim 13 wherein the axial force is applied while the exterior surface of the cylindrical body is spin-formed to maintain its diameter.

* * * * *